Jan. 14, 1930.  B. F. CAMMACK ET AL  1,743,596
PISTON
Filed May 8, 1928   2 Sheets-Sheet 1
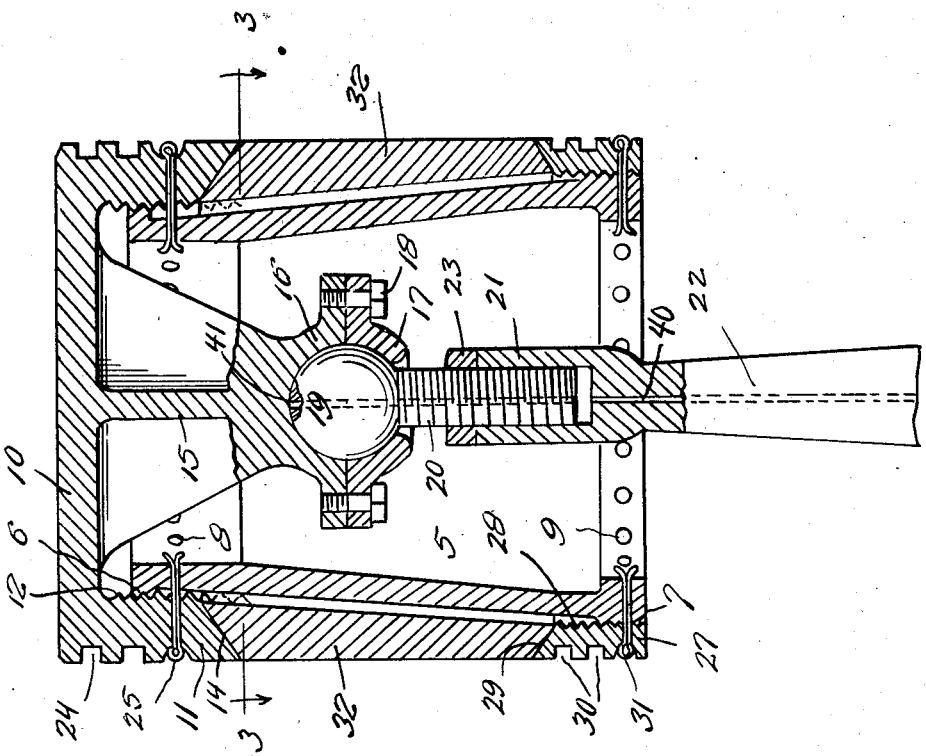
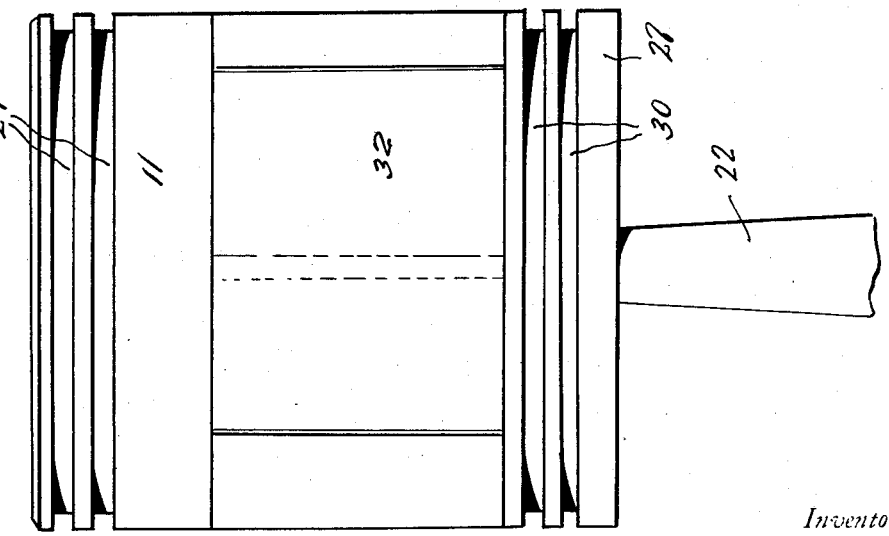
Inventor
B. F. Cammack,
B. F. Hines, Jr.
By Clarence A. O'Brien
Attorney Jan. 14, 1930.  B. F. CAMMACK ET AL  1,743,596
PISTON
Filed May 8, 1928  2 Sheets-Sheet 2
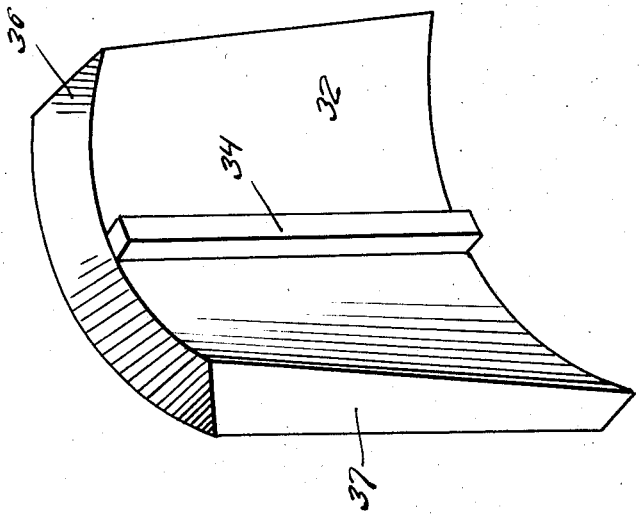
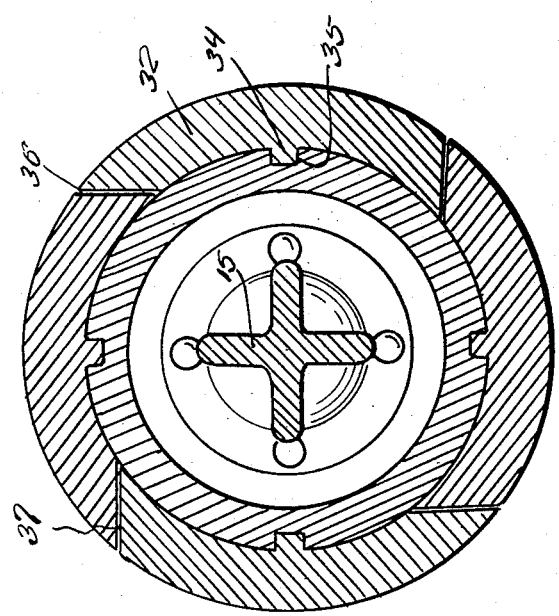
Inventor
B.F. Cammack
B.F. Hines, Jr.
By Clarence A. O'Brien
Attorney Patented Jan. 14, 1930

1,743,596

UNITED STATES PATENT OFFICE

BENJAMIN F. CAMMACK AND BENJAMIN F. HINES, JR., OF SMACKOVER, ARKANSAS

PISTON

Application filed May 8, 1928. Serial No. 276,152.

The present invention relates to a piston for use in internal combustion engines, steam engines, and the like and has for its prime object to provide a piston structure which may be substantially uniform, and the rings thereof being spaced so as to wear the walls of the cylinder the same from end to end.

Another very important object of the invention resides in the provision of a piston structure of this nature, which is comparatively simple, inexpensive to manufacture, thoroughly efficient and reliable in use and operation and otherwise well adapted to the purpose for which it is designed.

With the above and numerous other objects in view, as will appear as the description proceeds, the invention resides in certain novel features of construction and in the combination and arrangement of parts as will be hereinafter more fully described and claimed.

In the drawings:

Figure 1 is a side elevation of a piston embodying the features of my invention.

Figure 2 is a longitudinal section therethrough.

Figure 3 is a transverse section therethrough, taken substantially on the line 3—3 of Figure 2, and Figure 4 is a perspective view of one of the segments.

Referring to the drawing in detail, it will be seen that the numeral 5 denotes a tubular body which tapers upwardly and has an external annular flange 6 at its upper end and an external annular flange 7 at its lower end. An annular series of openings 8 are provided at the end of the body, and a similar annular series of openings 9 is provided at the lower end of the body. The numeral 10 denotes a piston head having a skirt portion 11, internally threaded as at 12 to engage with the threaded flange 6 and to extend a slight distance therebelow. The lower edge of the skirt is bevelled inwardly and upwardly as is indicated at 14. A cruciform shank structure 15 extends inwardly from the head 10 and terminates in a socket portion 16 having a cap 17 detachably engaged therewith by bolts 18 or in any other suitable manner. A wrist ball 19 is located in the socket formed by the socket portion 16 and the cap 17 and has a shank 20 extending therefrom threadably receivable in the socket 21 of the connecting rod 22, and a lock nut 23 is provided, on the shank 21, so that suitable adjustments may be made. The skirt of the head is provided with a plurality of packing ring grooves 24. Cotter pins 25 extend through the skirt and through openings 8. A ring 27 is internally threaded, as is indicated at 28 to engage the threads of the flange 7 and the upper edge of this ring is bevelled inwardly and downwardly as is indicated at 29.

The exterior of the ring 27 is provided with packing ring grooves 30. Cotter pins 31 extend through the rings to engage in the openings 9. Wall sections or segments 32 are disposed above the body 5 between skirt 11 and the ring 27 and these segments have their upper edges bevelled in parallelism with bevelled edges 14 and their lower edges bevelled in parallelism with the edges 29. In the present example of the invention, there are four of these segments and each comprises an interior rib 34 extending into a groove 35 provided in the body 5, so as to prevent the circumferential movement of the segments. The side edges of the segments are bevelled as indicated at 36 and 37 at angles to each other.

It is thought that the construction, operation, utility and advantages of this invention will now be quite apparent to those skilled in this art, without a more detailed description thereof.

The present embodiment of the invention has been disclosed in detail merely by way of example, since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

The connecting rod 22 is provided with a longitudinally extending opening in alinement with a similar opening in the ball 19 and shank 20, the openings being shown respectively at 40 and 41 for the purpose of allowing oil for lubricating the ball 19 and the socket 16.

Having thus described our invention, what we claim as new is:

1. A piston structure of the class described comprising a tubular body tapering upwardly and having external threads at its upper end and at its lower end, and a series of openings at its upper end and at its lower end, a piston head having a skirt internally threaded to engage the upper ends of the body and cotter pins to engage in the upper series of openings, a ring threadedly engaged with the lower threads and having cotter pins to engage in the lower series of openings, and a plurality of segments about the body between the skirt and the ring.

2. A piston structure of the class described comprising a tubular body tapering upwardly and having external threads at its upper end and at its lower end, and a series of openings at its upper end and at its lower end, a piston head having a skirt internally threaded to engage the upper ends of the body and cotter pins to engage in the upper series of openings, a ring threadedly engaged with the lower threads and having cotter pins to engage in the lower series of openings, a plurality of segments about the body between the skirt and the ring, each segment having an interior rib and the body having a groove for the reception thereof to prevent circumferential movement of the segment.

3. A piston structure of the class described comprising a tubular body tapering upwardly and having external threads at its upper end and at its lower end, and a series of openings at its upper end and at its lower end, a piston head having a skirt internally threaded to engage the upper ends of the body and cotter pins to engage the upper series of openings, a ring threadedly engaged with the lower threads and having cotter pins to engage in the lower series of openings, a plurality of segments about the body between the skirt and the ring, each segment having an interior rib and the body having a groove for the reception thereof to prevent circumferential movement of the segment, the upper and lower edges of the segments being bevelled upwardly and inwardly and downwardly and inwardly respectively and the adjacent edges of the skirt and ring being similarly bevelled.

4. A piston structure of the class described comprising a tubular body tapering upwardly and having external threads at its upper end and at its lower end, and a series of openings at its upper end and at its lower end, a piston head having a skirt internally threaded to engage the upper ends of the body and cotter pins to engage in the upper ends of the openings, a ring threadedly engaged with the lower threads and having cotter pins to engage in the lower series of openings, a plurality of segments about the body between the skirt and the ring, each segment having an interior rib and the body having a groove for the reception thereof to prevent circumferential movement of the segment, the upper and lower edges of the segments being bevelled upwardly and inwardly and downwardly and inwardly respectively and the adjacent edges of the skirt and ring being similarly bevelled, said skirt and said ring being provided with exterior packing ring grooves.

In testimony whereof we affix our signatures.

BENJAMIN F. CAMMACK.
BENJAMIN F. HINES, Jr.